April 23, 1963  R. A. HUDSON ETAL  3,086,781
OIL SEAL ASSEMBLIES
Filed Feb. 29, 1960

INVENTORS
Raymond A. Hudson,
BY Robert S. Nelson,
Cromwell, Greist + Warden
Attys.

United States Patent Office 3,086,781
Patented Apr. 23, 1963

3,086,781
OIL SEAL ASSEMBLIES
Raymond A. Hudson, Birmingham, and Robert S. Nelson, Pontiac, Mich., assignors to Chicago Rawhide Manufacturing Co., Chicago, Ill., a corporation of Illinois
Filed Feb. 29, 1960, Ser. No. 11,746
4 Claims. (Cl. 277—39)

The invention relates to new and improved oil seal assemblies of the type which incorporate therein self-contained sealing action. More specifically, the new and improved oil seal assemblies of the present invention are particularly adapted for installational use in wheel housings of trailers or semi-trailers, the assemblies being provided with self-contained sealing means which in addition to establishing a lubricant seal are operative to exclude the ingress of dirt into the assemblies to an extent that efficient lubricant sealing action initially established is efficiently maintained throughout operation under conditions of adverse nature.

It is an object of the present invention to provide new and improved oil seal assemblies of the self-contained type which eliminate the necessity to rely on specially prepared shaft or bore finishes in providing efficient sealing operation, the assemblies providing their own finish surface against which a running sealing engagement is maintained.

Another object is to provide new and improved oil seal assemblies of the self-contained sealing type having dirt exclusion means therein capable of efficiently operating to prevent the ingress of dirt or other foreign matter into the assemblies and thereby maintain efficient sealing action therein, the dirt exclusion means cooperatively functioning in the assembly to maintain lubrication of the self-contained sealing action.

A further object is to provide new and improved oil seal assemblies of the type described above wherein assembly flushing means are provided for dirt and foreign matter removal from the assemblies as collected against the dirt exclusion means forming a part thereof.

An additional obect is to provide a new and improved oil seal assembly for mounting between a pair of relatively movable parts, this assembly including a casing receiving therein a block-like portion provided with a sealing surface extending out of the casing for sealing engagement with one of the parts, the block-like portion further including a flexible sealing lip portion which is held in sealing engagement with an inner surface portion of the casing, the assembly being improved by the provision of a specially located dirt excluder sealing lip also in sealing engagement with an inner surface portion of the casing, the position of the block-like portion in the casing being controlled by rib-like means forming a part thereof which are located to space the block-like portion in the casing during and following installation of the assembly.

Other objects not specifically set forth will become apparent from the following detailed description of the invention made in conjunction with the accompanying drawings wherein.

Figure 1:
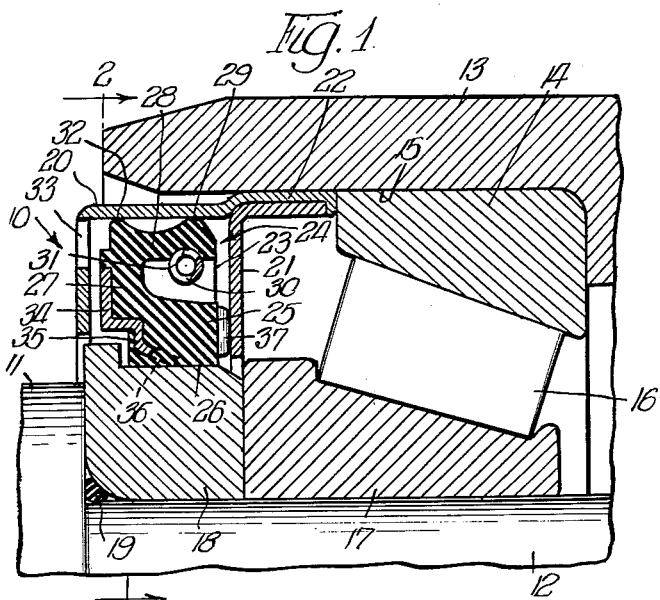
FIG. 1 is a fragmentary section of a trailer wheel installation illustrating one form of new and improved oil seal assembly operatively mounted therein.

In FIG. 1, a seal assembly 10 incorporating the principles of the present invention is illustrated as mounted in its operative position in a trailer wheel installation. Such an installation is of well known arrangement and for this reason only a small portion of the installation is illustrated. Generally, a fixed axle 11 having a spindle portion 12 is received into the hub 13 of a trailer wheel and is journaled therein by suitable roller bearing assemblies. The roller bearing assembly illustrated in FIG. 1 includes an outer race 14 which is fixed in a bore 15 of the hub 13 and a plurality of rollers 16 retained by an inner race 17 which is in bearing engagement with the spindle 12. An annular collar 18 is fixedly mounted on the spindle 12 and holds an O-ring 19 in compressed relation thereagainst.

As is typical of a trailer wheel installation, the wheel including its hub 13 rotates by reason of the various bearing assemblies relative to the axle 11 and spindle 12. Lubricant is trapped in the hub 13 by a hub cap (not shown) covering one end of the spindle 12 and a seal assembly such as the assembly 10 shown in FIGS. 1 and 2. The seal assembiy 10 includes a metallic casing which as illustrated is formed of two stampings 20 and 21. Each of the stampings is generally L-shape in cross section and may be combined in a known manner to form an annular, axially extending press fit rim-like portion 22 which is forced into the bore 15 of the hub 13 into end abutment with the outer race 14 of the bearing assembly. In this manner the casing is mounted for rotation with the wheel including its hub 13 relative to the spindle 12.

The casing stampings 20 and 21 define therebetween an annular, radially inwardly opening housing area 23 in which a sealing member 24 is mounted. The sealing member 24 includes a block-like body portion 25 which projects partially radially inwardly from the housing area 23. The inner face 26 of the body portion 25 defines a sealing surface placed in static sealing engagement with an outer surface portion of the collar 18 of the trailer wheel installation. In this manner the sealing member 24 is frictionally mounted to the collar 18 and spindle 12 against rotation relative thereto.

The sealing member 24 also includes a radially outwardly directed web portion 27 which is integrally formed with the body portion 25 and which terminates in an axially directed, flexible sealing lip portion 28. The free end portion of the flexible sealing lip portion 28 is provided with a radially outwardly directed sealing lip 29 which is in sealing engagement with the adjacent inner surface portion of the casing stamping 20. A continuous coil spring 30 is mounted in a groove 31 along a surface of the flexible sealing lip portion 28 at a point opposite the sealing lip 29. This spring functions to maintain the sealing lip 29 in continuous sealing engagement with the inner surface of the casing stamping 20.

The base of the flexible sealing lip portion 28 adjacent its juncture with the web portion 27 is provided with an integrally formed dirt excluder lip seal 32 which is also in continuous sealing engagement with the adjacent inner surface of the casing stamping 20. The dirt excluder lip seal 32 is positioned in close association with the sealing seal 29 and is angularly inclined into sealing engagement with the inner surface of the casing stamping 20 in a direction away from the sealing lip 29. With this arrangement the sealing lip 29 prevents loss of lubricant from the interior of the hub 13 and the dirt excluder lip seal 32 is arranged to prevent the ingress of dirt or other foreign matter through the housing area 23 into contact with the sealing lip 29.

In order to prevent excessive accumulation and possible caking or packing of dirt or other foreign matter in the housing area 23 adjacent the dirt excluder lip seal 32, the casing stamping 20 is provided with a plurality of circumferentially spaced apertures 33 located in the radial leg portion thereof. These apertures provide means whereby the flushing out of dirt and water from the housing area 24 on the aperture side of the sealing member will occur as a result of centrifugal action during wheel operation. In operational use, the casing rotates with the wheel relative to the spindle 12 and the sealing member 24 is fixed relative to the spindle 12. Thus the sealing lip 29 and the dirt excluder lip seal 32 provide running seals operative against the adjacent inner surface of the casing stamping 20. The assembly constitutes an external, self-contained type seal with centrifugal forces developed within the casing providing a means by which lubricant is supplied to the seal lip 29 for continuous lubrication thereof. Actually, it has been found advisable to prelubricate between the sealing lip 29 and the dirt excluder lip seal 32 prior to seal assembly installation to make sure that adequate sealing lip lubrication is provided to assure long-life, trouble free operation of the assembly. The dirt excluder lip seal 32 prevents the ingress of foreign matter into contact with the sealing lip 29 and centrifugal action provides for continuous flushing of the housing area outwardly of the dirt excluder lip seal 32 in conjunction with utilization of the apertures 33 as previously described.

The assembly 10 exhibits longer effective life than ordinary radial seals used in the same installations. The inner surface of the casing stamping 20 is quite smooth and provides a built-in, well protected sealing surface against which the lips 29 and 32 efficiently function. The stampings are rolled and the finish of the surfaces formed by rolling does not have the minute sharp points of a ground finish. Such a finish also contains microscopic depressions which retain lubricant. Any pre-lubrication of the area between the lips 29 and 32 is efficiently retained for lubrication of the running seal during operation of the assembly.

The sealing surface 26 of the body portion 25 functions as a static seal on the collar 18. Following insertion of the seal assembly 10 in the bore 15 of the hub 13, introduction of the axle 11 and spindle 12 with the collar 18 mounted thereon results merely in a pushfit of the sealing member body portion 25 on the collar 18. To improve the holding power of the body portion 25 for static sealing engagement with the collar 18, a metallic stamping 34 is secured to the sealing member 24 and extends along an outer surface of the web portion 27 to add strength to the same. A radially inwardly inclined portion 35 of the stamping 34 is embedded in the body portion 25 and extends to the sealing surface 26 thereof. To provide the inclined portion 35 with a requisite degree of resiliency to increase the holding power of the body portion in maintaining a static seal, the innermost edge of the inclined portion 35 is formed with a plurality of circumferentially spaced recesses or grooves 36. The pressfit static seal provided by the body portion 25 on the collar 18 eliminates the necessity of resorting to costly finishing operations to improve the sealing efficiency of the outer surface of the collar 18. Efficient operation of the seal assembly merely requires an oil-tight pressfit against the collar 18.

Figure 2:
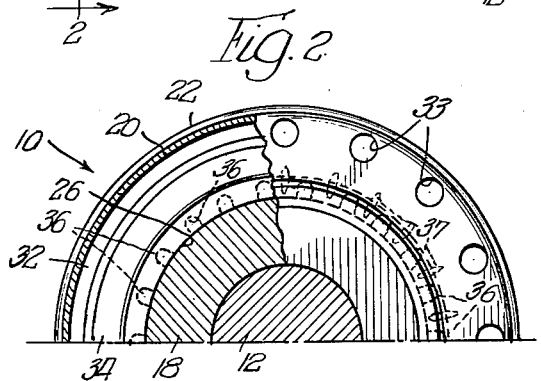
FIG. 2 is a fragmentary half section of the installation and seal of FIG. 1 as generally viewed along line 2—2 in FIG. 1.

To provide for proper axial positioning of the sealing member 24 within the housing area 23 of the casing and thus permit centrifugal lubrication and flushing of the casing, the sealing member body portion 25 is provided along the inner radial face thereof with a plurality of integrally formed, flexible rib-like projections 37. These projections in the form of chaplets are circumferentially spaced as illustrated in FIG. 2 and are located on the body portion 25 to be compressed upon axle installation. The projections 37 are at least partially flattened during axle and spindle installation in the wheel housing following seal assembly installation but provide sufficient resistance to axial movement of the sealing member within the casing to retain radial clearance between the sealing member and the inner surface of the casing stamping 21. Upon operation of the installation, rotation of the casing relative to the sealing member will ultimately result in wearing of the projections 37 to an extent that any frictional drag initially produced is overcome.

Figure 4:
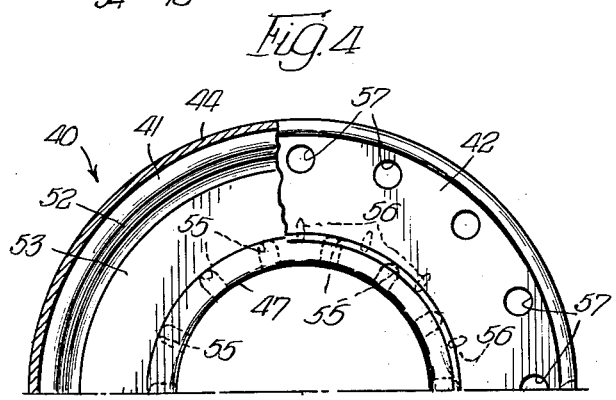
FIG. 4 is a fragmentary half section of the seal of FIG. 3 taken generally along line 4—4 in FIG. 3.
Figure 3:
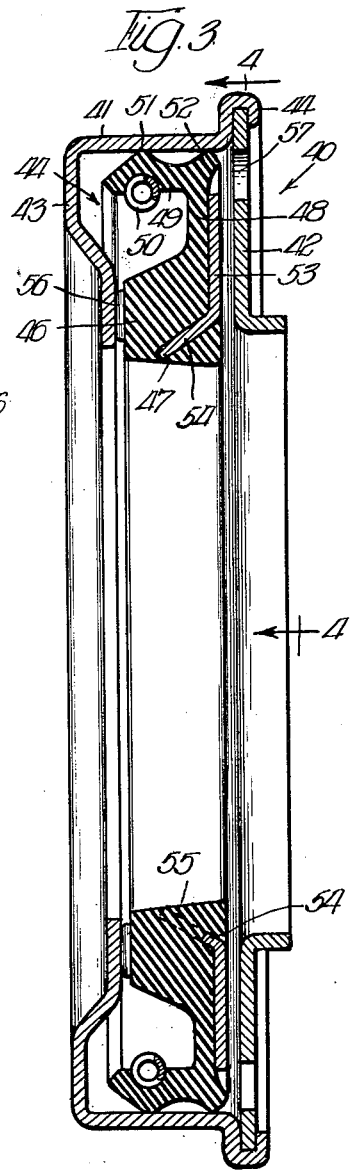
FIG. 3 is a vertical section of a modified form of oil seal assembly forming a part of the present invention.

FIGS. 3 and 4 illustrate a slightly modified seal assembly 40. This assembly includes a casing formed from interconnected stampings 41 and 42, the stamping 41 including an axially projecting nose portion 43 which functions to abut an outer race of a bearing during mounting of the assembly 40 in a trailer wheel assembly. The stampings 41 and 42 cooperate to further provide a radially projecting rim-like portion 44 designed for axial abutment with a radial surface of a wheel hub for fixed, pressfit positioning of the seal assembly.

The assembly 40 includes a sealing member 45 having a body portion 46, the inner surface 47 of which is designed for pressfit static sealing engagement with an axle surface. The sealing member 44 is provided with a relatively thin web portion 48 terminating in an axially extending flexible sealing portion 49 mounting a coil spring 50 thereon which urges a lubricant sealing lip 51 thereof into running sealing engagement with the adjacent inner surface of the casing stamping 41. The base of the web portion 48 has integrally formed therewith an axially inclined dirt excluder lip seal 52 which is also in running sealing engagement with the adjacent inner surface of the casing stamping 41.

A rigidifying stamping 53 is secured to the web portion 48 and body portion 46 and an axially inclined portion 54 thereof is embedded in the body portion 46 and extends into the plane of the sealing surface 47. The inclined portion 54 is provided with a plurality of circumferentially spaced recesses or grooves 55 along the inner margin thereof. These grooves impart a degree of resiliency to the inclined portion 54 of the stamping 53 to improve the pressfit static seal established between the surface 47 and an axle surface.

The body portion 46 along a radial surface adjacent the stamping 41 is provided with a plurality of circumferentially spaced, integrally formed rib-like projections or chaplets 56 which function to maintain proper axial positioning of the sealing member 44 in the casing. The casing stamping 42 is provided with a plurality of circumferentially spaced apertures 57 to permit flushing of the casing in the area adjacent the dirt excluder lip seal 52 in response to centrifugal action.

The seal assembly 40 operates in the same manner as described in conjunction with the seal assembly 10. From comparative consideration of these assemblies it will be appreciated that the principles of the present invention may be incorporated in many different seal designs without losing the new and improved seal functioning features. Each assembly illustrated provides for efficient exclusion of dirt which not only prevents loss of efficiency and damage to the lubricant sealing lip but also contributes to increased bearing life. Efficient sealing of the type described also prevents brake slip and grab due to lubricant leakage onto the brake drums. This safeguard increases brake drum life, decreases tire wear and materially improves the safety factor of vehicle operation.

Obviously certain modifications and variations of the invention as hereinbefore set forth may be made without departing from the spirit and scope thereof, and therefore only such limitations should be imposed as are indicated in the appended claims.

We claim:

1. An oil seal assembly for mounting between a pair of relatively movable parts, said assembly including a generally U-shaped casing comprising an axially directed base and a pair of radial walls receiving therebetween a sealing member having a block-like portion provided with a generally flat sealing surface extending out of said casing for sealing and fixed engagement with one of said parts, a web portion integrally formed with said block-like portion and extending therefrom within said casing in a direction away from said sealing surface, and a flexible sealing lip formed integral with said web portion and angled relative thereto, the free end portion of said flexible sealing lip being in running sealing engagement with the inner surface of the base of said casing, the base of said flexible sealing lip adjacent its juncture with said web portion being formed with an integral dirt excluder lip seal in running sealing engagement with said inner surface adjacent one of said radial walls, said casing having a plurality of apertures therein immediately adjacent said dirt excluder lip seal providing means for flushing said casing and said dirt excluder lip seal immediately inwardly of said one radial wall, said excluder lip seal being located intermediate said flexible sealing lip and said apertures.

2. The assembly of claim 1 wherein the block-like portion of said sealing member has embedded therein a rigidifying means which extends along said web portion adjacent said radial wall to aid in maintaining said flexible sealing lip in operative position.

3. An oil seal assembly for mounting between a pair of relatively movable parts, said assembly including a generally U-shaped casing comprising an axially directed base and a pair of radial walls receiving therebetween a sealing member having a block-like portion provided with a generally flat sealing surface extending out of said casing for sealing and fixed engagement with one of said parts, a web portion integrally formed with said block-like portion and extending therefrom within said casing in a direction away from said sealing surface, and a flexible sealing lip formed integral with said web portion and angled relative thereto, the free end portion of said flexible sealing lip being in running sealing engagement with the inner surface of the base of said casing, the base of said flexible sealing lip adjacent its juncture with said web portion being formed with an integral dirt excluder lip seal inclined into running sealing engagement with said inner surface adjacent one of said radial walls in a direction away from the free end portion of said flexible sealing lip, said casing having a plurality of apertures therein immediately adjacent said dirt excluder lip seal providing means for flushing said casing and said dirt excluder lip seal immediately inwardly of said one radial wall, said dirt excluder lip seal being located intermediate said flexible sealing lip and said apertures, a radial face of said block-like portion being provided with projecting rib-like means in engagement with an adjacent inner surface portion of the other of said radial walls of said casing to hold said sealing member in spaced relation to said casing during and following installation of said assembly for lubrication of said flexible sealing lip.

4. The assembly of claim 3 wherein the block-like portion of said sealing member has embedded therein a rigidifying means which extends along said web portion adjacent said one radial wall to aid in maintaining said flexible sealing lip in operative position.

References Cited in the file of this patent

UNITED STATES PATENTS

| | | |
|---|---|---|
| 2,743,951 | Ayres et al. | May 1, 1956 |
| 2,871,041 | Anderton | Jan. 27, 1959 |
| 2,938,744 | Fritch | May 31, 1960 |
| 3,021,161 | Rhoads et al. | Feb. 13, 1962 |